United States Patent
Misra et al.

(10) Patent No.: US 11,778,454 B2
(45) Date of Patent: Oct. 3, 2023

(54) SERVICE PROVIDER INDEPENDENT MOBILE PHONE NUMBER-BASED SERVICE DELIVERY

(71) Applicant: International Business Machines Corporation, Armonk, NY (US)

(72) Inventors: Dharmendra Misra, Pune (IN); Abhinav Aggarwal, Chapel Hill, NC (US); Rahul Kumar, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 17/449,130

(22) Filed: Sep. 28, 2021

(65) Prior Publication Data

US 2023/0106391 A1    Apr. 6, 2023

(51) Int. Cl.
*H04W 8/26* (2009.01)
*H04W 8/06* (2009.01)
*H04W 8/12* (2009.01)

(52) U.S. Cl.
CPC ............ *H04W 8/26* (2013.01); *H04W 8/065* (2013.01); *H04W 8/12* (2013.01)

(58) Field of Classification Search
CPC .......... H04W 8/26; H04W 8/065; H04W 8/12
USPC ............... 455/435.1, 432.1, 414.1, 410, 418
See application file for complete search history.

(56) References Cited

U.S. PATENT DOCUMENTS

| | | | | |
|---|---|---|---|---|
| 7,010,296 | B2* | 3/2006 | Sakai et al. | H04W 8/183 455/435.2 |
| 7,257,122 | B1* | 8/2007 | Keturi | H04L 69/329 370/466 |
| 10,149,156 | B1* | 12/2018 | Tiku et al. | H04W 12/66 |
| 2014/0329504 | A1 | 11/2014 | Gupta | |
| 2016/0227043 | A1 | 8/2016 | Hunt et al. | |
| 2017/0257886 | A1 | 9/2017 | Adjakple et al. | |
| 2018/0070402 | A1* | 3/2018 | Chinthalapudi et al. | H04W 76/25 |
| 2018/0260834 | A1* | 9/2018 | Stuckey et al. | G06Q 20/4016 |
| 2020/0143017 | A1* | 5/2020 | Yoon et al. | G06F 21/31 |

FOREIGN PATENT DOCUMENTS

| | | | | |
|---|---|---|---|---|
| IN | 325041 | A1 | 11/2019 | |
| KR | 100257935 | B1* | 6/2000 | H04M 15/90 |

* cited by examiner

*Primary Examiner* — Nghi H Ly
(74) *Attorney, Agent, or Firm* — Yee & Associates, P.C.

(57) ABSTRACT

Delivering communication services is provided. A request for a mobile number from a mobile number authority is received from a subscriber. In response to receiving the request from the subscriber, the mobile number is assigned to the subscriber and sent to the subscriber. A request to register with the mobile number authority is received from a communication service provider. In response to receiving the request from the communication service provider, the communication service provider is registered with the mobile number authority. The mobile number from the mobile number authority may be used by the subscriber to subscribe at the same time to a plurality of communication services for a mobile device from a plurality of different communication service providers registered with the mobile number authority.

20 Claims, 9 Drawing Sheets

SERVICE PROVIDER INDEPENDENT MOBILE PHONE NUMBER-BASED SERVICE DELIVERY

BACKGROUND

1. Field

The disclosure relates generally to providing communication services for mobile devices over cellular or mobile communication networks and more specifically to providing communication services from multiple communication service providers for a mobile device having a single mobile number.

2. Description of the Related Art

Currently, a user of a mobile device needs a mobile phone number for the device to subscribe to various services for the device from a service provider. Depending upon local regulations and permission, a subscriber may change from one service provider to another without needing to change the mobile phone number for the device. However, a subscriber cannot use the same mobile phone number to consume communication services from two or more different service providers at the same time on the same mobile device. If a subscriber wants to consume services from several different service providers at the same time, the subscriber must obtain several different mobile phone numbers.

Communication service providers are offering more services over time. Many countries may face a shortage of mobile numbers in the future or may need to increase the number of digits in mobile numbers because subscribers are holding multiple numbers as innovations in new communications services products offered to subscribers continues to grow.

SUMMARY

According to one illustrative embodiment, a computer-implemented method for delivering communication services is provided. A computer receives a request from a subscriber for a mobile number from a mobile number authority. In response to the computer receiving the request from the subscriber, the computer assigns a mobile number to the subscriber and sends the mobile number to the subscriber. The computer also receives a request from a communication service provider to register with the mobile number authority. In response to receiving the request from the communication service provider, the computer registers the communication service provider with the mobile number authority. The subscriber then may use the mobile number from the mobile number authority to subscribe to a communication service for a mobile device from the communication service provider that registered with the mobile number authority According to other illustrative embodiments, a computer system and computer program product for delivering communication services are provided.

DETAILED DESCRIPTION

Figure 1:
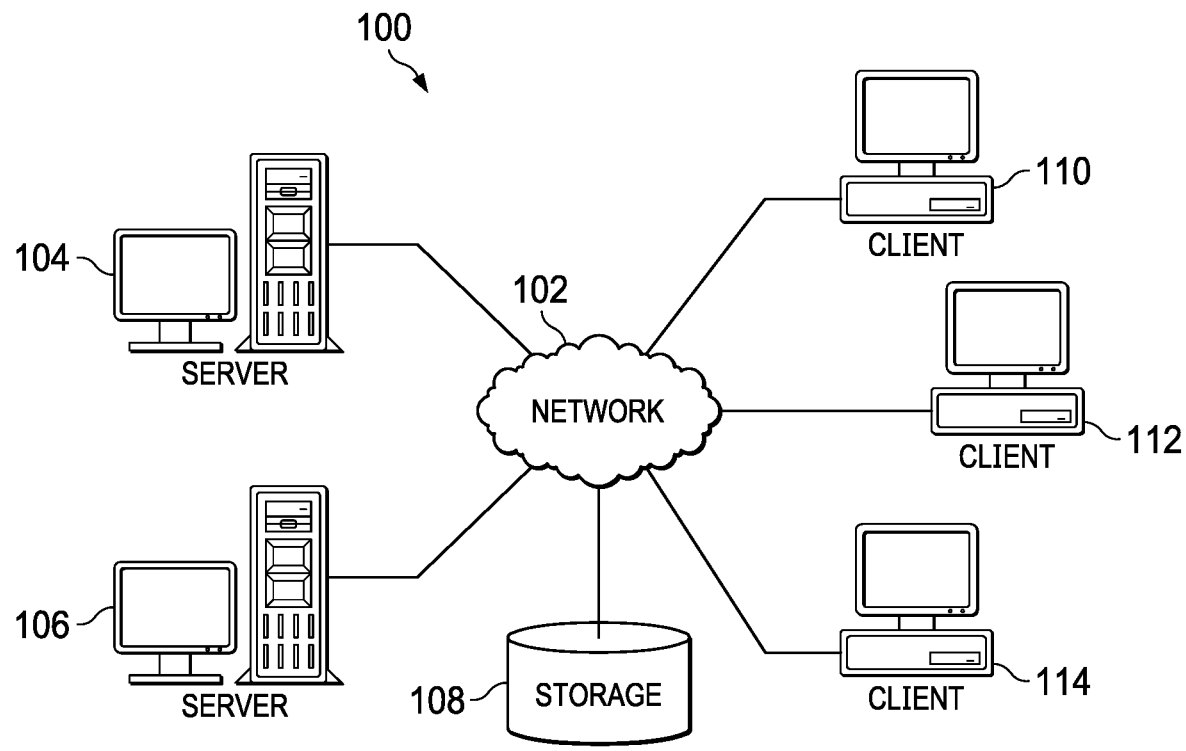
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account various considerations. For example, the illustrative embodiments recognize and take into account that currently a subscriber is not able to consume services from multiple communications service providers on one mobile number with absolute flexibility and on the merit of the service quality. For example, if radio coverage of one communication service provider is poor at the home of a subscriber whereas an alternative communication service provider provides bad coverage in the factory where the subscriber works, then currently the subscriber may be forced to live with bad service at home or at work or subscribe to communications services from two different communications service providers with two different mobile numbers. There is a need to free up both subscribers and mobile network systems from the burden of needing multiple mobile numbers to consume services from different providers and to enable flexible service consumption instantly.

In accordance with an illustrative embodiment, mobile numbers are made independent of communications service providers. In accordance with an illustrative embodiment, mobile numbers are managed, distributed and sold by a centralized entity within a regulatory region, such as a country, that is independent of communication service providers in the region. In other words, mobile numbers can be sold and managed as a commodity that is not directly associated with any communication service provider. A subscriber can in the region using a single mobile number.

In accordance with an illustrative embodiment, a subscriber may subscribe to receive selected communication services from any communication service provider, or multiple communication service providers, by a relatively simple process. If a subscriber needs or wants a communication service that is offered by a communication service provider, or multiple communication service providers, the subscriber first obtains a mobile number from the centralized mobile number authority. The subscriber then provides the mobile number to a communication service provider, or multiple communication service providers, to subscribe to the desired communication services.

Mobile devices can change locations and may need to be always connected to a radio link in some form. Moreover, a subscriber to communications services may change the mobile device with which a mobile number is associated. In accordance with an illustrative embodiment, these challenges may be addressed through a change in the conventional mechanism of service delivery and associated use of mobile number addressing. Mobile number addressing may become increasingly relevant when delivery of multi-variant services on different technology platforms is natively available on devices, such that a subscriber does not need to download and manage separate applications to consume various different services on a device.

Some regions may require relatively strict know your customer, KYC, compliance. KYC is a process followed in some regions before enabling any communications service to a customer. In accordance with an illustrative embodiment, communication service providers may be relieved of KYC compliance overhead. Instead, the entity tasked with the management of mobile numbers can perform any processes need to comply with KYC requirements.

In addition to the features describe above and elsewhere herein, illustrative embodiment may provide one or more of the following features: Provide communications services independently of any fixed association of a mobile number with a communication service provider. Provide always-on connection for voice and emergency services. Provide consistent, similar, or better service experience to what mobile subscribers are getting currently. Support multiple services of the same category or different categories offered by one or many communication service providers at the same time on one mobile number. Provide for adding or removing services offered by any communication service provider within a regulatory jurisdiction without impacting any existing service adversely or in illogical manner. Route and complete communications by accepting or denying incoming communications independent of the active session radio access network interface without impacting current customer experience. Provide options for selecting from among current active subscriptions for services from one or multiple communication service providers during initiation of the service consumption.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client computers 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
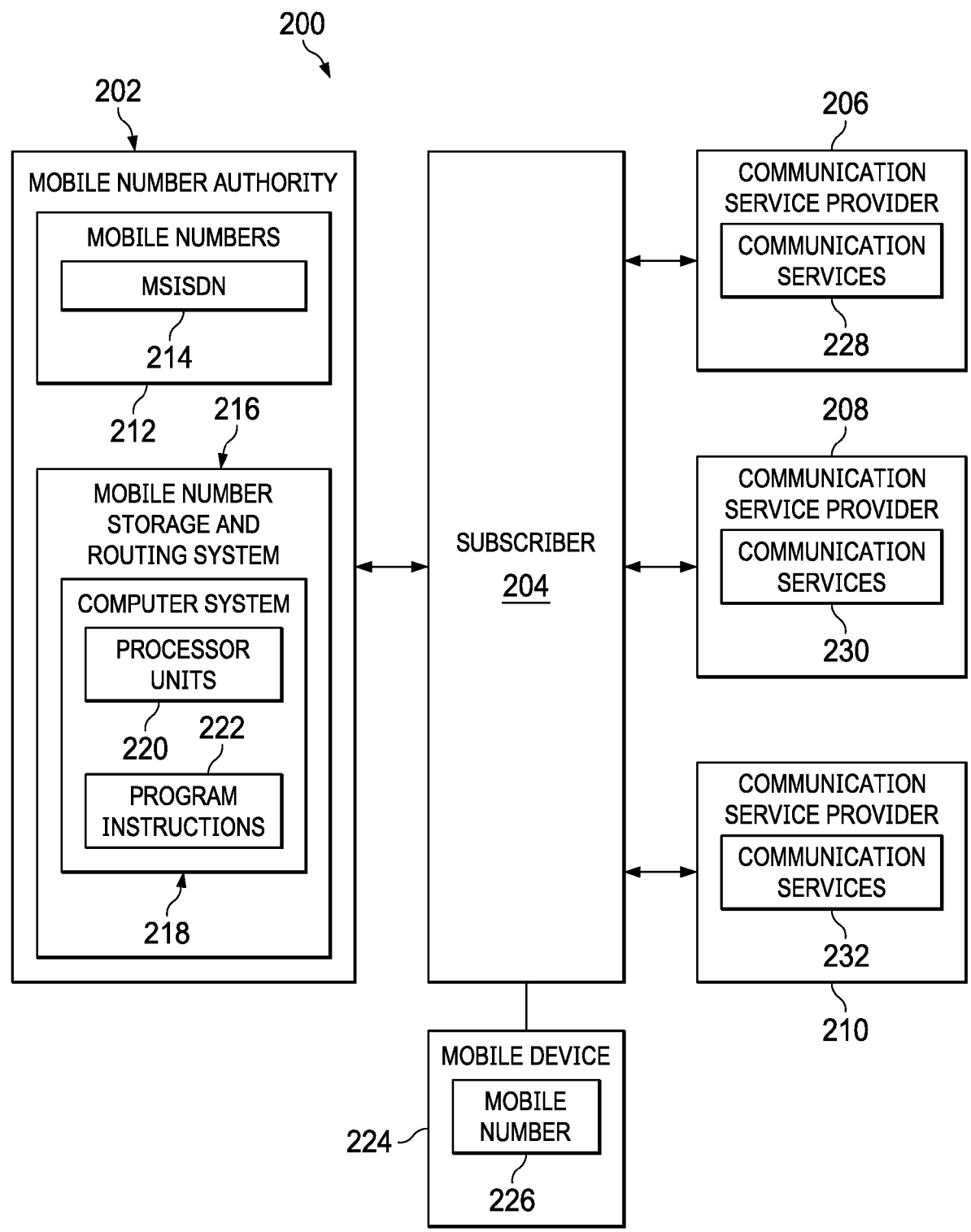
FIG. 2 is a block diagram of a communication service delivery system in accordance with an illustrative embodiment.

Turning to FIG. 2, a block diagram of communication service delivery system 200 is depicted in accordance with an illustrative embodiment. In accordance with an illustrative embodiment, communication service delivery system 200 is a communication service provider independent mobile number-based system for providing communication services from multiple communication service providers at the same time for a mobile device having a single mobile number.

In accordance with an illustrative embodiment, communication service delivery system 200 includes mobile number authority 202, a number of subscribers, such as subscriber 204, and a number of communication service providers, such communication service providers 206, 208, and 210. A communication service delivery system 200 in accordance with an illustrative embodiment may have more than one subscriber and more or fewer than three communication service providers. A communication service delivery system 200 in accordance with an illustrative embodiment may include any appropriate number of subscribers and communication service providers.

Mobile number authority 202 is an entity that is authorized to distribute, manage, and operate mobile numbers 212. Mobile numbers 212 may be Mobile Station International Subscriber Directory Numbers, MSISDN 214. MSISDN 214 are numbers used to identify a mobile phone number internationally. MSISDN 214 are internationally unique and of fixed length in line with international and regional regulations. Alternatively, or in addition, mobile numbers 212 may include forms of public uniform resource identifier, URI, or other appropriate numbers.

Mobile number authority 202 may or may not charge any fee for mobile numbers 212, depending on local regulation and policy. Mobile number authority is also responsible for credentials associated with mobile numbers 212 so that it can authenticate each service request. Mobile number authority 202 also holds a master database for subscriber properties such as location, active network profile, active service profile, and public identity profiles. Mobile number authority 202 is the source of authentication for any independent service request. Mobile number authority 202 also holds mobile device identity information and anchors any change in mobile device equipment. Although individual communication service providers 206, 208, 210 can also store some of this information, information held by mobile number authority 202 is the single source of truth for call processing and service fulfilment.

The various functions performed by mobile number authority 202 can be implemented in mobile number storage and routing system 216. As depicted, mobile number storage and routing system 216 comprises computer system 218.

Mobile number storage and routing system 216 can be implemented in software, hardware, firmware or a combination thereof. When software is used, the operations performed by mobile number storage and routing system 216 can be implemented in program instructions configured to run on hardware, such as a processor unit. When firmware is used, the operations performed by mobile number storage and routing system 216 can be implemented in program instructions and data and stored in persistent memory to run on a processor unit. When hardware is employed, the hardware may include circuits that operate to perform the operations in mobile number storage and routing system 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 218 is a physical hardware system and includes one or more data processing systems. When more than one data processing system is present in computer system 218, those data processing systems are in communication with each other using a communications medium. The communications medium can be a network. The data processing systems can be selected from at least one of a computer, a server computer, a tablet computer, or some other suitable data processing system.

As depicted, computer system 218 includes a number of processor units 220 that are capable of executing program instructions 222 implementing processes in mobile number storage and routing system 216 when mobile number storage and routing system 216 includes software. As used herein, a processor unit in the number of processor units 220 is a hardware device and is comprised of hardware circuits such as those on an integrated circuit that respond and process instructions and program code that operate a computer. When a number of processors units 220 execute instructions for a process, the number of processors units 220 is one or more processors units that can be on the same computer or on different computers. In other words, the process can be distributed between processors units on the same or different computers in a computer system. Further, the number of processors units 220 can be of the same type or different types of processors units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Subscriber 204 is a person or entity that wants to subscribe to any communication service. When subscriber 204 wants to subscribe to a communication service for mobile device 224, subscriber 204 contacts mobile number authority 202 to obtain mobile number 226 for mobile device 224. Subscriber 204 then can contact any communication service provider 206, 208, 210 for any service. Subscriber 204 may contact multiple communication service providers 206, 208, 210 for different services or the same service.

Communication service providers 206, 208, 210 may offer one or many types of communication services 228, 230, 232, respectively. Once subscriber 204 obtains mobile number 226 from mobile number authority 202, subscriber 204 can contact any communication service provider 206, 208, 210, or multiple communication service providers 206, 208, 210 to get respective communication services 228, 230, 232.

In this illustrative example, communication service delivery system 200 includes components that may be implemented in hardware, such as the hardware shown in network data processing system 100 in FIG. 1. For example, without limitation, mobile number storage and routing system 216 and mobile device 224 may be implemented in hardware.

The illustration of communication service delivery system 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
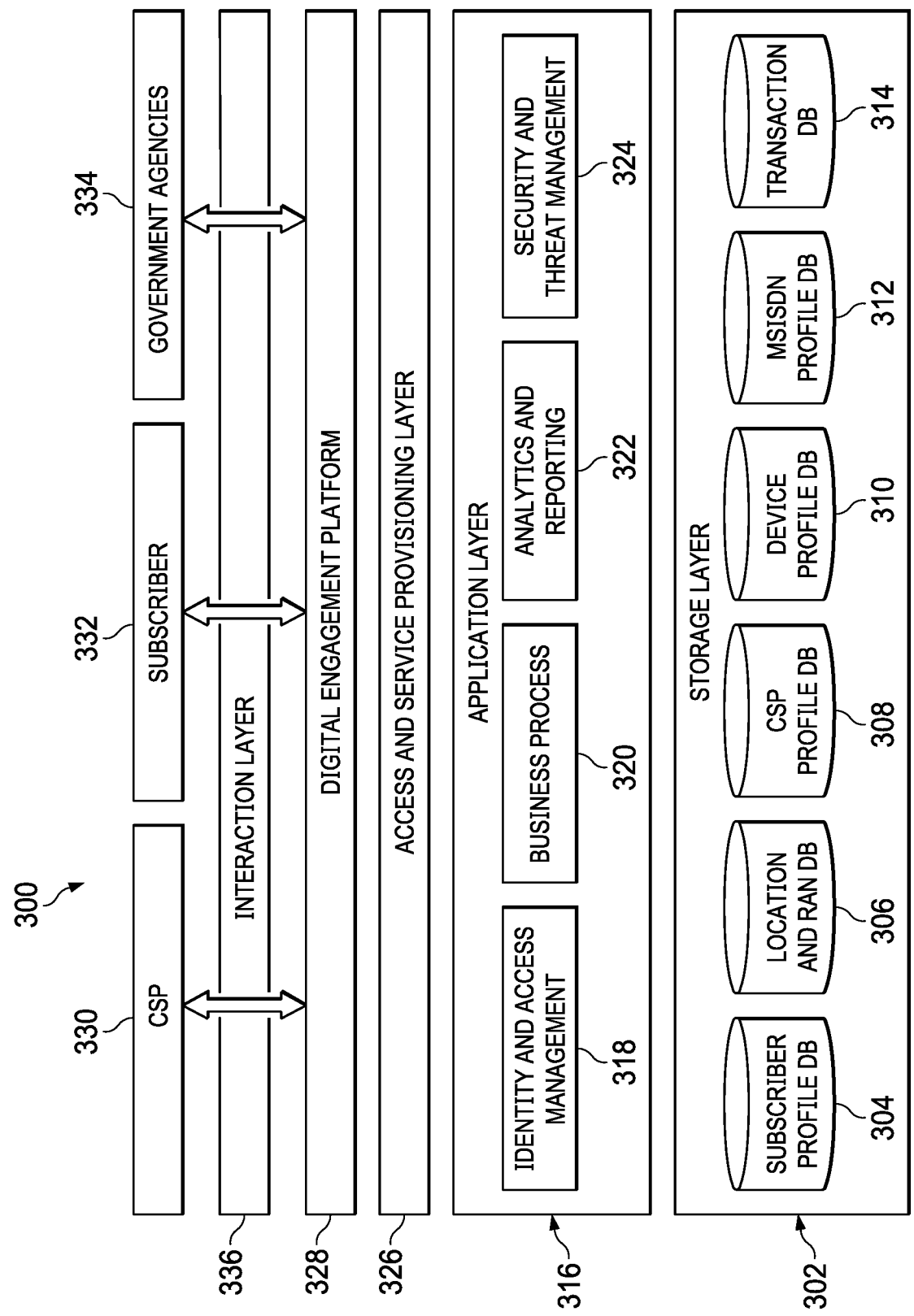
FIG. 3 is a block diagram of a mobile number storage and routing system in accordance with an illustrative embodiment.

Turning to FIG. 3, a block diagram of mobile number storage and routing system 300 is depicted in accordance with an illustrative embodiment. Mobile number storage and routing system 300 is an example of mobile number storage and routing system 216 operated by or for mobile number authority 202 in communication service delivery system 200 in FIG. 2. Mobile number storage and routing system 300 is an example of one implementation of an architecture for a mobile number storage and routing system in accordance with an illustrative embodiment. A mobile number storage and routing system in accordance with an illustrative embodiment may include more functionality or less functionality, depending upon individual local requirements The functions performed by a mobile number authority in accordance with an illustrative embodiment requires the storage of various kinds of data. Storage layer 302 in mobile number storage and routing system 300 provides this data storage functionality. Subscriber profile database 304 stores subscriber profile information as needed by the mobile number authority. Location and radio access network database 306 stores the present location of each mobile device associated with a mobile number and radio access network details. Communication service provider profile database 308 contains information regarding communication service providers that are allowed to provide communication services in the area covered by the mobile number authority. Device profile database 310 stores information regarding devices used with a mobile number to access any service over a radio access network or connect over a radio access network. Device profile database 310 also may store keys and algorithms to facilitate device equipment changes. Mobile number profile database 312 stores mobile numbers and manages the lifecycle of mobile numbers. Mobile number profile database 312 may also store other public identities and resource identifiers so that it becomes a universal source of such information. Transaction database 314 stores all requests and responses made to or by the mobile number authority along with the status, time stamps, and associated properties of such requests and responses, as needed.

Application layer 316 in mobile number storage and routing system 300 hosts the applications and business functions used by the mobile number authority. Identity and access management application 318 provides functionality around ability to provide monitored access to actors, allow access to mobile number authority applications and data based on role and eligibility, and retain details of sessions accessing sensitive information, such as subscriber locations. Business process application 320 provides the end-to-end business process through which the mobile number authority operations run. Analytics and reporting application 322 provides analytics and reporting capabilities around transactions, data, and other functions of the mobile number authority. Security and threat management application 324 provides end-to-end platform, user, data, and application security. Security and threat management application 324 also provides application programming interface end point security and may be configured to manage any threat that may arise.

Access and service provisioning layer 326 in mobile number storage and routing system 300 provides a uniform platform for accessing the functionalities in mobile number storage and routing system 300. Access and service provisioning layer 326 also may be configured to enable service provisioning order processing.

Digital engagement platform 328 in mobile number storage and routing system 300 enables an omni-channel experience for actors interacting with the mobile number authority, in particular external actors that want to access the mobile number authority, such as communication service providers 330, subscribers 332, and government agencies 334. Communication service providers 330 includes communication service providers that have a relationship with the mobile number authority or that are requesting to establish a relationship with the mobile number authority. Subscribers 332 are individuals or entities that hold or want to hold a mobile number from the mobile number authority. Government agencies 334 may include government entities that are authorized to access the mobile number authority for lawful information collection or audit or any other authorized function. Interaction layer 336 in mobile number storage and routing system 300 may provide open application programming interfaces, webservices, or other integration capabilities through which actors can interact with the mobile number authority.

The functionality of mobile phone number storage and routing system 300 as described herein may be implemented in software, hardware, firmware or a combination thereof. When software is used, the operations performed by mobile phone number storage and routing system 300 may be implemented in program code configured to run on hardware, such as a processor unit. When firmware is used, the operations performed by mobile phone number storage and routing system 300 may be implemented in program code and data and stored in persistent memory to run on a processor unit. When hardware is employed, the hardware may include circuits that operate to perform the operations in mobile phone number storage and routing system 300.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

The illustration of mobile phone number storage and routing system 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
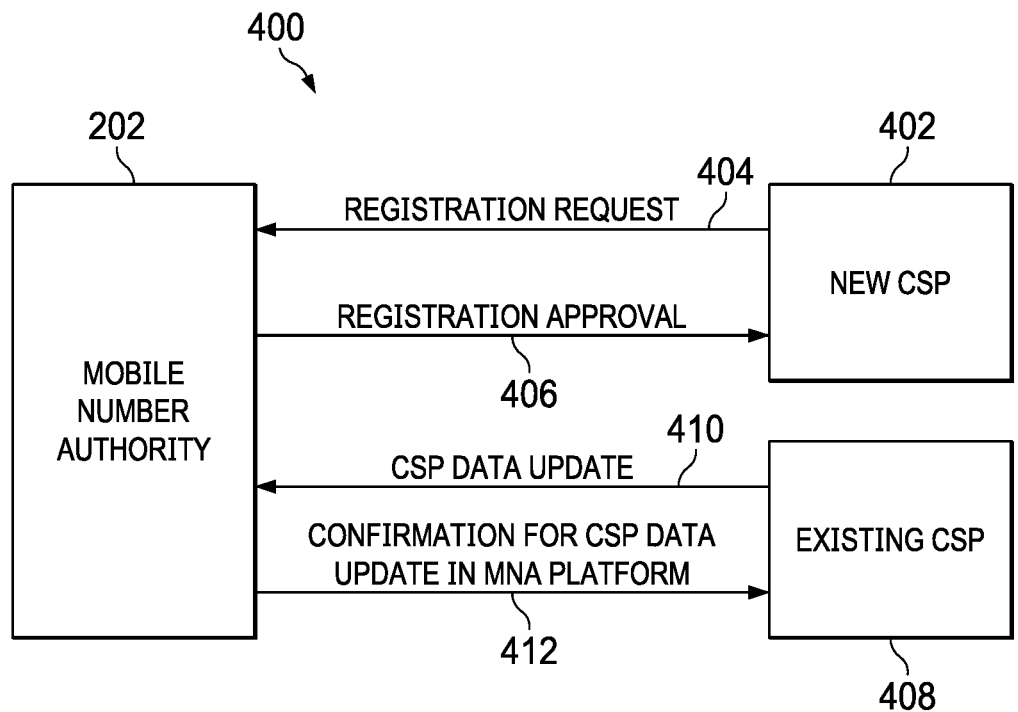
FIG. 4 is a block diagram of service provider onboarding and data management in a communication service delivery system in accordance with an illustrative embodiment.

Turning to FIG. 4, a block diagram of service provider onboarding and data management 400 in a communication service delivery system is depicted in accordance with an illustrative embodiment. Service provider onboarding and data management 400 may be implemented in communication service delivery system 200 in FIG. 2. Service provider onboarding and data management 400 includes communication between mobile number authority 202 and communication service providers for onboarding and registered data management.

A new communication service provider 402 that wants to provide communication services in the area covered by mobile number authority 202 sends registration request 404 to mobile number authority 202 for registration. In response, mobile number authority 202 confirms back registration approval 406 to new communication service provider 402. Communications between new communication service provider 402 and mobile number authority 202 for registration request 404 and registration approval 406 may be made through online webservices or through physical paper or through any other legally permitted mechanism.

Existing communication service provider 408 that is already registered with mobile number authority 202 may send communication service provider data update 410 to mobile number authority 202 to correct, update, or modify any information with respect to the individual properties of existing communication service provider 408. In response, mobile number authority 202 may send confirmation 412 to existing communication service provider 408 to confirm that the information for existing communication service provider 408 has been updated. Communications between existing communication service provider 408 and mobile number authority 202 for communication service provider data update 410 and confirmation 412 may be through any appropriate mechanism that is permitted in the region covered by mobile number authority 202.

Figure 5:
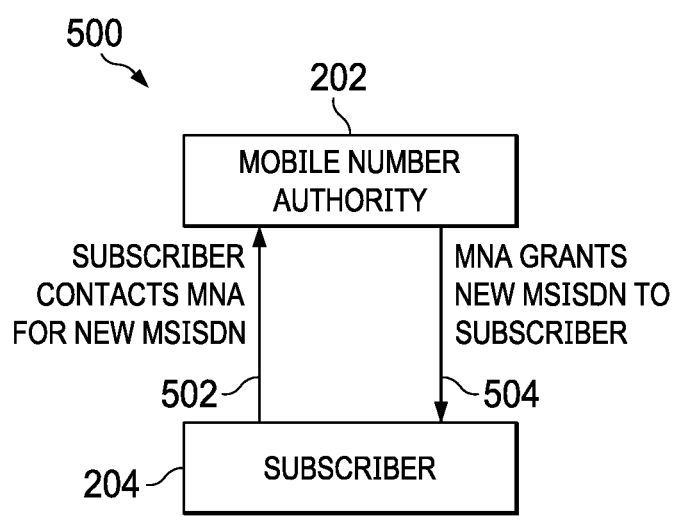
FIG. 5 is a block diagram of a subscriber obtaining a mobile number in a communication service delivery system in accordance with an illustrative embodiment.

Turning to FIG. 5, a block diagram of a subscriber obtaining a mobile number 500 in a communication service delivery system is depicted in accordance with an illustrative embodiment. Subscriber obtaining a mobile number 500 may be implemented in communication service delivery system 200 in FIG. 2.

Subscriber 204 obtains a mobile number from mobile number authority 202 by sending request for a mobile number 502 to mobile number authority 202. In response to receiving request for a mobile number 502, mobile number authority 202 may perform various tasks before sending a mobile number to subscriber 204. Such tasks may include validation, verification, fee payment, or other appropriate tasks that may be required by regulations. Mobile number authority 202 then sends a mobile number 504 to subscriber 204.

Figure 6:
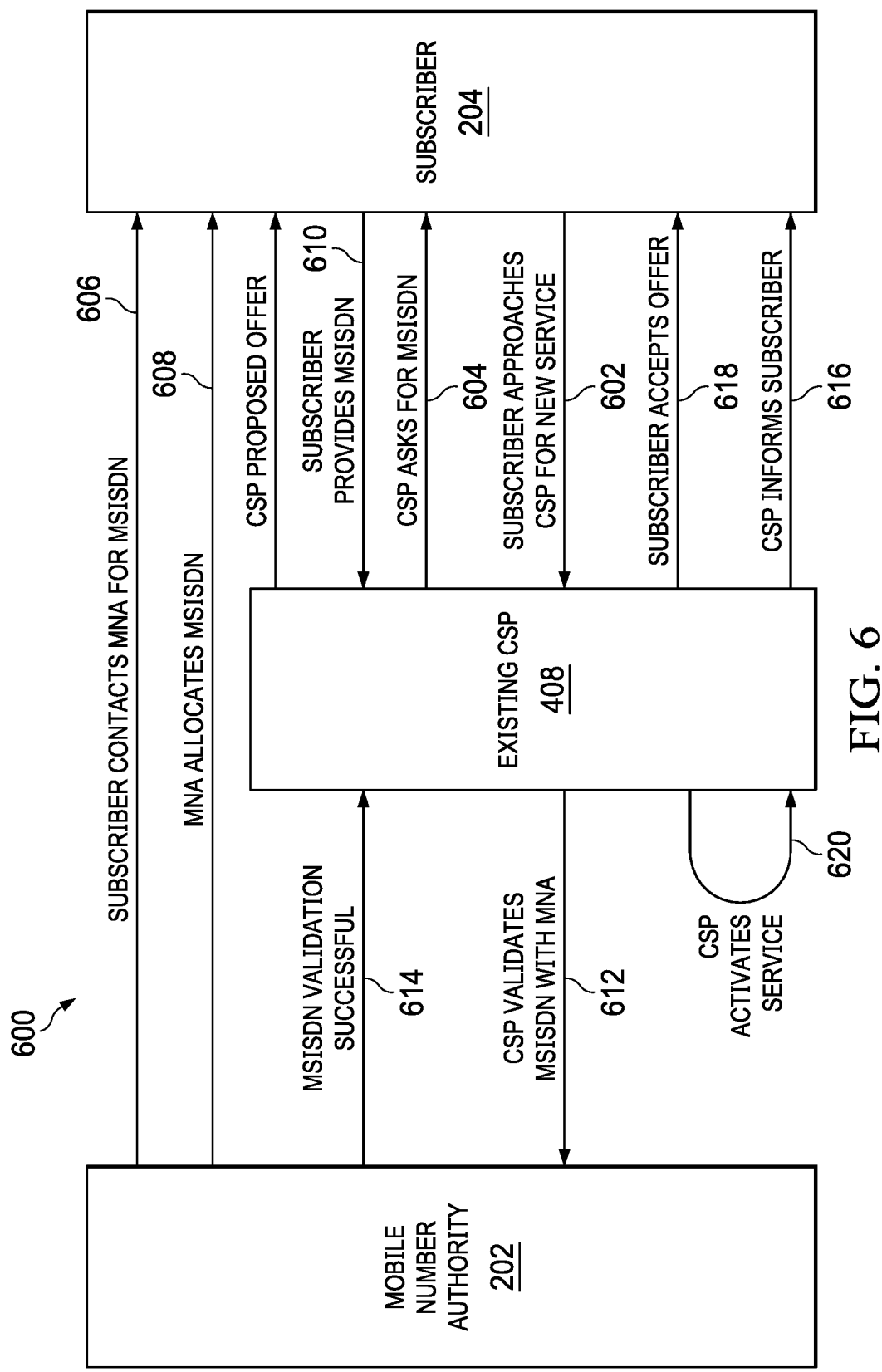
FIG. 6 is a block diagram of a subscriber subscribing to a communication service in a communication service delivery system in accordance with an illustrative embodiment.

Turning to FIG. 6, a block diagram of a subscriber subscribing to a communication service 600 in a communication service delivery system is depicted in accordance with an illustrative embodiment. Subscriber subscribing to a communication service 600 may be implemented in communication service delivery system 200 in FIG. 2.

Subscriber 204 may subscribe to a communication service provided by existing communication service provider 408 that is registered with mobile number authority 202. Subscriber 204 may first contact existing communication service provider 408 regarding a communication service 602. For example, without limitation, subscriber 204 may look on a website for existing communication service provider 408 or respond to an advertisement or reference for communication services offered by existing communication service provider 408.

Existing communication service provider 408 requests a mobile number 604 from subscriber 204. If subscriber 204 does not have a mobile number, existing communication service provider 408 may instruct subscriber 204 to get a mobile number from mobile number authority 202.

If subscriber 204 does not have a mobile number, subscriber 204 can request a mobile number 606 from mobile number authority 202. In response, mobile number authority 202 allocates a mobile number and sends the mobile number 608 to subscriber 204.

Subscriber 204 then sends the requested mobile number 610 to existing communication service provider 408. In response to receiving the mobile number, existing communication service provider 408 sends a request to validate the mobile number 612 to mobile number authority 202. Mobile number authority 202 confirms the validity and eligibility of the mobile number and sends an indication that the mobile number validation was successful 614 to existing communication service provider 408.

Existing communication service provider 408 then informs subscriber 204 that it can provide the requested communication services 616. Existing communication service provider 408 may propose various offers for providing requested communication services and additional communication services to subscriber 204. There may be negotiations between existing communications service provider 408 and subscriber 204 until agreement is reached. Subscriber 204 may then accept an offer 618 to provide communication services, after which existing communication service provider 408 activates the communication services 620.

Figure 7:
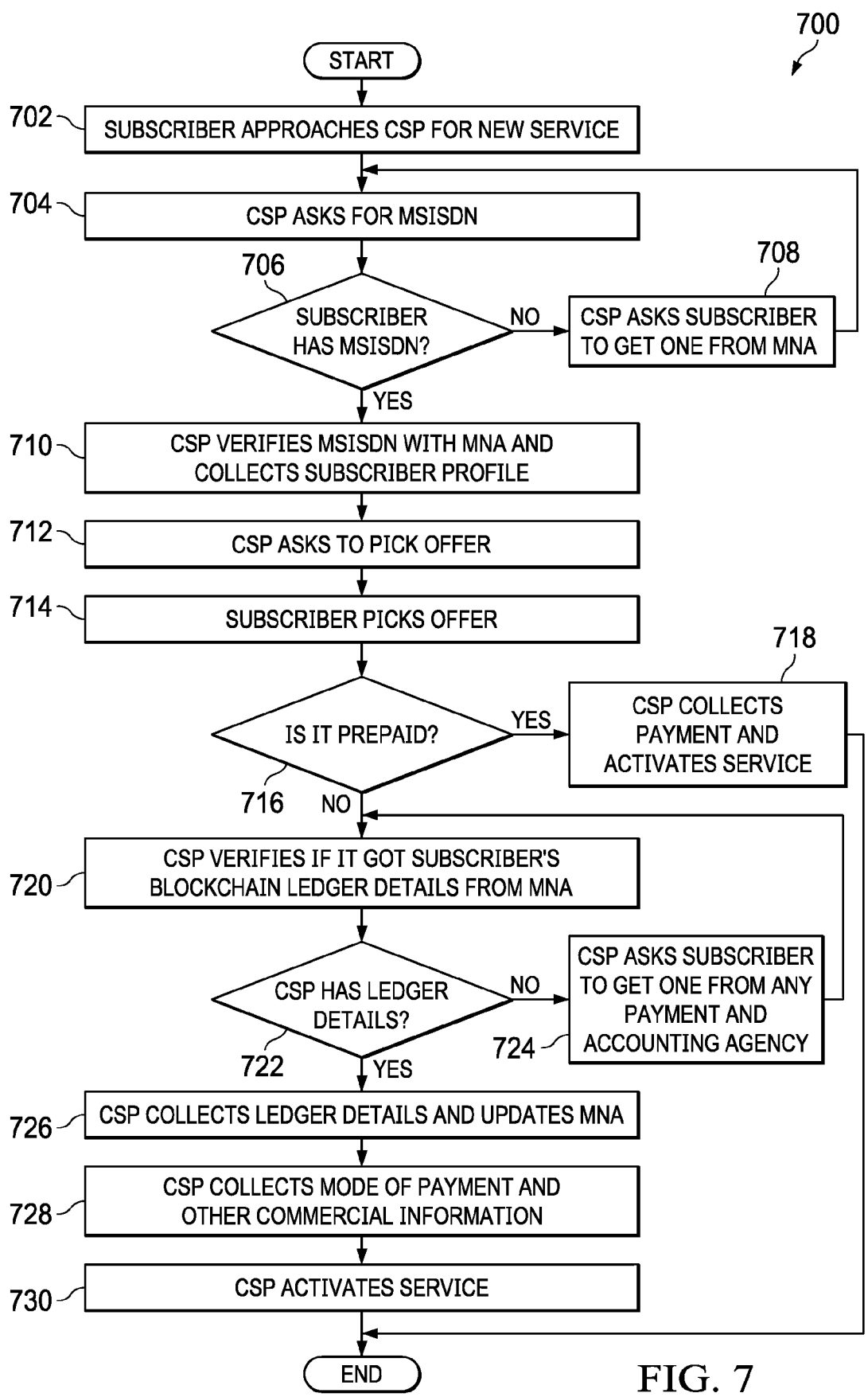
FIG. 7 is an illustration of a flowchart of a process for a subscriber subscribing to a communication service in accordance with an illustrative embodiment.

Turning to FIG. 7, an illustration of a flowchart of process 700 for a subscriber subscribing to a communication service is depicted in accordance with an illustrative embodiment. Process 700 may be implemented in communication service delivery system 200 in FIG. 2.

Process 700 begins with a subscriber contacting a communication service provider to start a new service (operation 702). The communication service provider then asks the subscriber for a mobile number (operation 704). It is determined whether the subscriber has the requested mobile number (operation 706). If the subscriber does not have a mobile number, the communication service provider asks the subscriber to get a mobile number from a mobile number authority (operation 708), with the process continuing with operation 704 thereafter.

In response to a determination at operation 706 that the subscriber has a mobile number, the mobile number is provided to the communication service provider and the communication service provider verifies the mobile number with the mobile number authority (operation 710). The communication service provider then asks the subscriber to select an offer for the communication service to be provided (operation 712), in response to which the subscriber selects one of the proffered offers (operation 714). It is determined whether the selected offer for the communication service is prepaid (operation 716). If the communication service is prepaid, the communication service provider collects the required payment from the subscriber and activates the communication service for the mobile number provided by the subscriber (operation 718), with the process terminating thereafter.

In response to a determination at operation 716 that the communication service is not prepaid, the communication service provider checks if it has received blockchain ledger details for the subscriber from the mobile number authority (operation 720) and determines whether it has the ledger details (operation 722). If the communication service provider does not have the ledger details for the subscriber, it may ask the subscriber to get one from an appropriate payment or accounting agency (operation 724), with the process returning to operation 720 thereafter. In response to a determination at operation 722 that the communication service provider has the ledger details for the subscriber, the communication service provider collects the ledger details and updates the mobile number authority (operation 726). The communication service provider then collects method of payment and other commercial information (operation 728) and activates the communication service for the mobile number provided by the subscriber (operation 730), with the process terminating thereafter.

Figure 8:
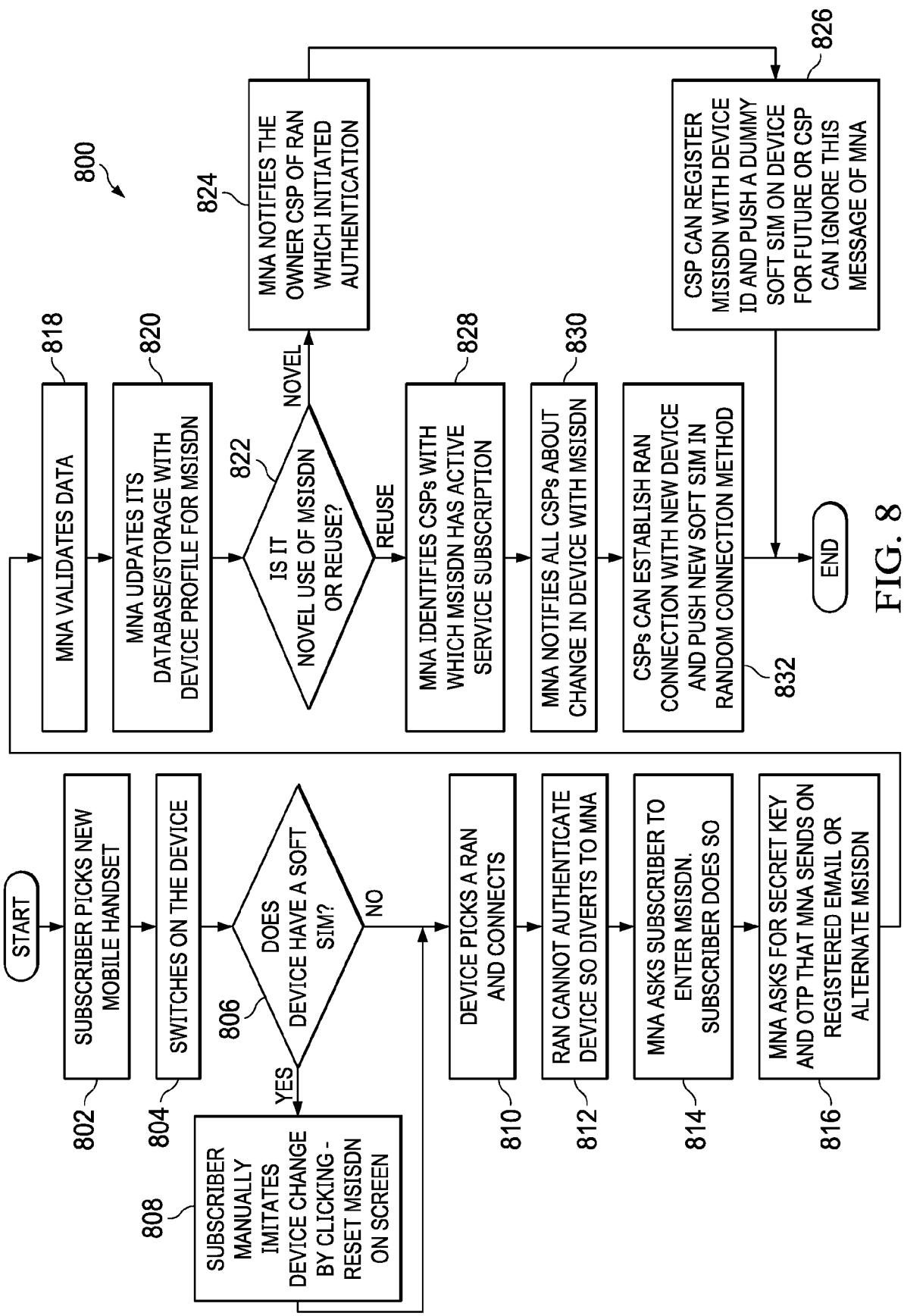
FIG. 8 is an illustration of a flowchart of a process for a subscriber starting a new device in accordance with an illustrative embodiment.

Turning to FIG. 8, an illustration of a flowchart of process 800 for a subscriber starting a new device is depicted in accordance with an illustrative embodiment. Process 800 may be implemented in communication service delivery system 200 in FIG. 2.

Process 800 begins with a subscriber selecting a new mobile hardware device to use (operation 802). The subscriber turns the device on (operation 804). It is then determined whether the device has a soft SIM, wherein subscriber identity module (SIM) functionality is delivered onto the device virtually or over the air (OTA) rather than by SIM hardware in the device (operation 806). A soft SIM is a lightweight secure software code containing a temporary identity, radio access network (RAN) identity and allowed RAN with a communication service provider, authentication key, applicable class of service, MSISDN, and Time to Live (TTL) counter. A communication service provider creates a unique soft SIM when a subscriber subscribes a service from the provider. If the device does have a soft SIM, the subscriber may manually initiate a device change by resetting the mobile number associated with the device (operation 808).

In response to a determination at operation 806 that the device does not have a soft SIM, or after resetting the mobile number at operation 808, the device selects an available radio access network and connects (operation 810). The radio access network will not be able to identify the new device, so it will direct the attempted connection to the mobile number authority (operation 812). The mobile number authority will request the subscriber to enter a mobile number (operation 814). In response to receiving the mobile number, the mobile number authority may ask the subscriber to enter a secret key or one time password that it sends to the subscriber via secure email or an alternate mobile number (operation 816). The mobile number authority then validates the data it receives from the subscriber (operation 818) and updates a database with a device profile for the mobile number provided by the subscriber (operation 820).

The mobile network authority may determine whether the mobile number is being used for the first time or is being reused (operation 822). In response to a determination that the mobile number is being used for the first time, the mobile number authority notifies the communication service provider of the radio access network that initiated the authentication process (operation 824). The communication service provider can then register the mobile number with an identifier for the new device and push a temporary soft SIM onto the device for future use (operation 826), with the process terminating thereafter.

In response to a determination at operation 822 that the mobile number provided by the subscriber is being reused, the mobile number authority identifies communication service providers with which the mobile number has an active subscription for communication services (operation 828). The mobile number authority notifies the identified communication service providers about the change in the hardware device associated with the mobile number (operation 830). The identified communication service providers can then establish a connection to the new device and push a new soft SIM to the device using a random connection method (operation 832), with the process terminating thereafter.

Figure 9:
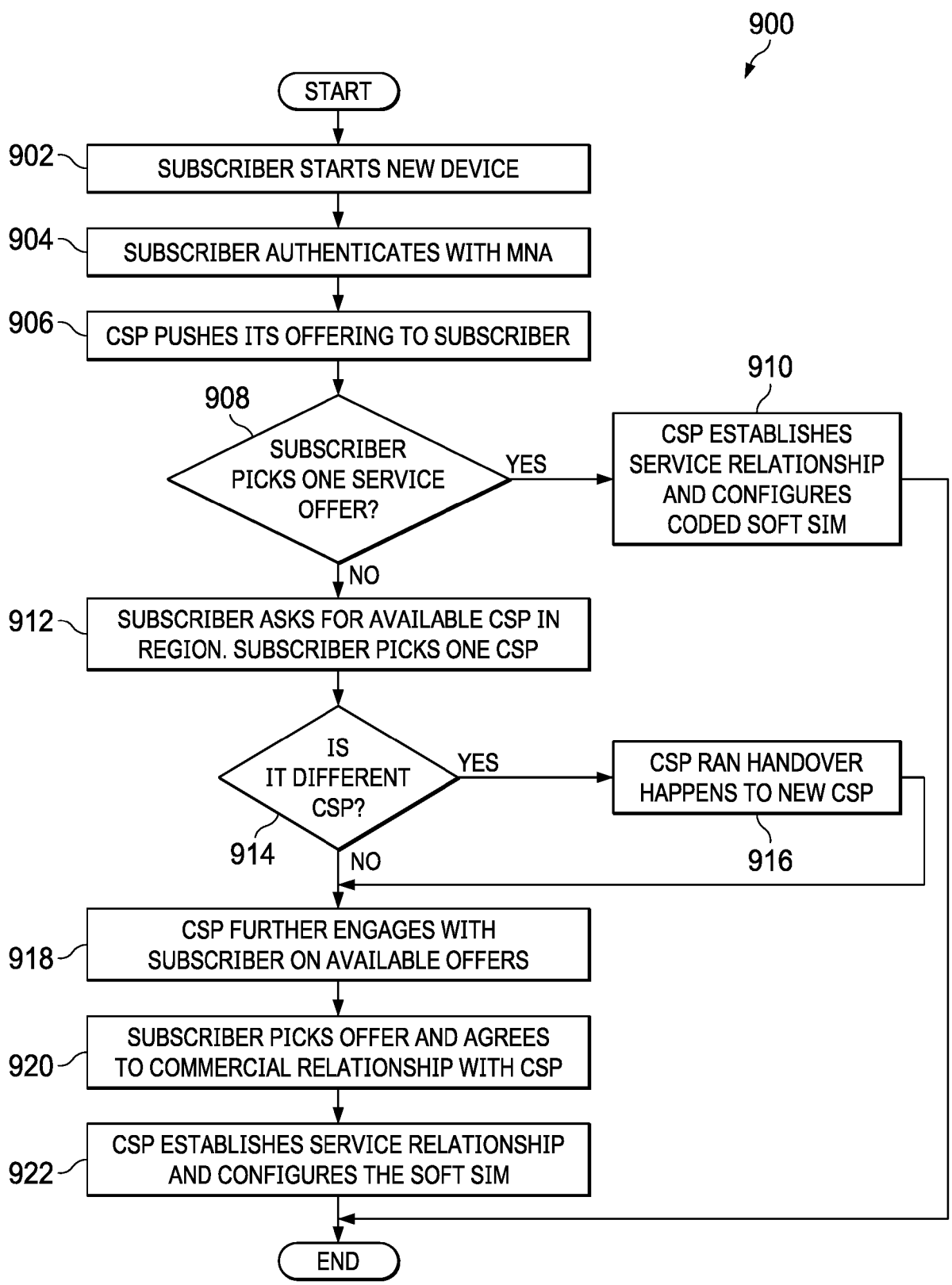
FIG. 9 is an illustration of a flowchart of a process for a subscriber subscribing to a service in accordance with an illustrative embodiment.

Turning to FIG. 9, an illustration of a flowchart of process 900 for a subscriber subscribing to a service is depicted in accordance with an illustrative embodiment. Process 900 may be implemented in communication service delivery system 200 in FIG. 2.

Process 900 begins with a subscriber starting a new device (operation 902). The subscriber authenticates with the mobile number authority (operation 904) and a communication service provider may push offerings for communication services to the subscriber (operation 906). It is determined whether the subscriber accepts one of the proffered offers for communication services (operation 908). In response to a determination that the subscriber accepts one of the offers, the communication service provider establishes a service relationship with the subscriber and configures the soft SIM in the new hardware device (operation 910), with the process terminating thereafter.

In response to a determination at operation 908 that the subscriber does not accept an offer for communication services, the subscriber may ask the mobile number authority for available communication service providers (operation 912). It is determined if an available communication service provider is different from the communication service provider that already offered communication services that were not accepted (operation 914). In response to a determination that the communication service provider is different, the mobile device is handed over to the radio access network of the other communication service provider (operation 916). The different communication service provider then may engage with the subscriber on available offers for communication services (operation 918). In response to a determination at operation 914 that a different communication service provider is not available, the communication service provider that initially offered communication services again engages with the subscriber on available offers for communication services at operation 918. The subscriber then selects a proffered offer for communication services and agrees to a commercial relationship with the communication service provider (operation 920). The communication service provider then establishes the relationship with the subscriber and configures the soft SIM in the new device (operation 922), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
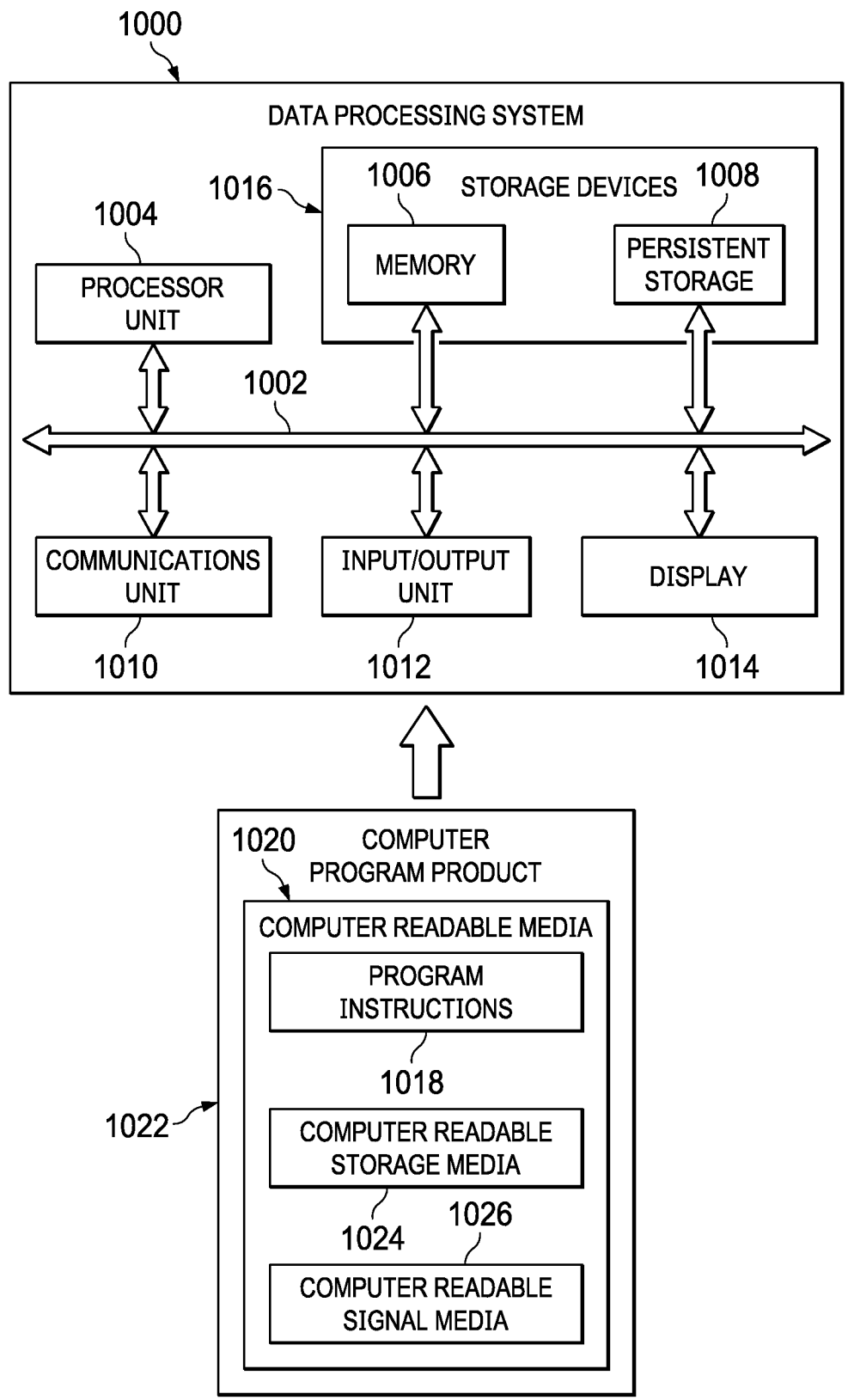
FIG. 10 is a block diagram of a data processing system in accordance with an illustrative embodiment.

Turning to FIG. 10, a block diagram of a data processing system is depicted in accordance with an illustrative embodiment. Data processing system 1000 can be used to implement server computer 104, server computer 106, client computer 110, client computer 112, and client computer 114 in FIG. 1. Data processing system 1000 can also be used to implement mobile number storage and routing system 300 in FIG. 3. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program instructions 1018 are located in a functional form on computer-readable media 1020 that is selectively removable and can be loaded onto or transferred to data processing system 1000 for execution by processor unit 1004. Program instructions 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program instructions 1018 rather than a medium that propagates or transmits program instructions 1018.

Alternatively, program instructions 1018 can be transferred to data processing system 1000 using a computer-readable signal media. The computer-readable signal media can be, for example, a propagated data signal containing program instructions 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of delivering communication services, comprising:
 receiving, by a computer, a request from a subscriber for a mobile number from a mobile number authority;
 responsive to the computer receiving the request from the subscriber, assigning, by the computer, a mobile number to the subscriber;
 sending, by the computer, the mobile number from the computer to the subscriber;
 receiving, by the computer, a request from a communication service provider to register with the mobile number authority;

responsive to the computer receiving the request from the communication service provider, registering, by the computer, the communication service provider with the mobile number authority; and subscribing, by the computer, a communication service from the communication service provider using the mobile number, wherein the mobile number is simultaneously used to subscribe a plurality of communication services from a plurality of different communication service providers, and wherein the plurality of communication services from the plurality of different communication service providers comprises a second communication service from a second communication service provider.

2. The computer-implemented method of claim 1, wherein the mobile number is a Mobile Station International Subscriber Directory Number.

3. The computer-implemented method of claim 1, wherein the plurality of communication services comprises different communication services from the plurality of different communication service providers.

4. The computer-implemented method of claim 1, wherein the plurality of communication services comprises the same communication service from each of the plurality of different communication service providers.

5. The computer-implemented method of claim 1 further comprising:
receiving, by the computer, a data update from the communication service provider to the mobile number authority, the data update including profile information for the communication service provider;
storing, by the computer, the profile information for the communication service provider in a communication service provider profile database; and
sending, by the computer, a confirmation to the communication service provider that the data update was received by the mobile number authority.

6. A computer for delivering communication services, the computer comprising:
a bus system;
a storage device connected to the bus system, wherein the storage device stores program instructions; and
a processor connected to the bus system, wherein the processor executes the program instructions to:
receive a request from a subscriber for a mobile number from a mobile number authority;
responsive to receiving the request from the subscriber, assign a mobile number to the subscriber;
send the mobile number to the subscriber;
receive a request from a communication service provider to register with the mobile number authority;
responsive to receiving the request from the communication service provider, register the communication service provider with the mobile number authority; and
subscribe a communication service from the communication service provider using the mobile number, wherein the mobile number is simultaneously used to subscribe a plurality of communication services from a plurality of different communication service providers, and wherein the plurality of communication services from the plurality of different communication service providers comprises second communication service from a second communication service provider.

7. The computer of claim 6, wherein the mobile number is a Mobile Station International Subscriber Directory Number.

8. The computer of claim 6, wherein the plurality of communication services comprises different communication services from the plurality of different communication service providers.

9. The computer of claim 6, wherein the plurality of communication services comprises the same communication service from each of the plurality of different communication service providers.

10. The computer of claim 6, wherein the processor further executes the program instructions to:
receive a data update from the communication service provider to the mobile number authority, the data update including profile information for the communication service provider;
store the profile information for the communication service provider in a communication service provider profile database; and
send a confirmation to the communication service provider that the data update was received by the mobile number authority.

11. A computer program product for delivering communication services, the computer program product comprising a non-transitory computer-readable storage medium having program instructions embodied therewith, the program instructions executable by a computer to cause the computer to perform the method of:
receiving a request from a subscriber for a mobile number from a mobile number authority;
responsive to receiving the request from the subscriber, assigning a mobile number to the subscriber;
sending the mobile number to the subscriber;
receiving a request from a communication service provider to register with the mobile number authority;
responsive to receiving the request from the communication service provider, registering the communication service provider with the mobile number authority; and
subscribing, by the computer, a communication service from the communication service provider using the mobile number, wherein the mobile number is simultaneously used to subscribe a plurality of communication services from a plurality of different communication service providers, and wherein the plurality of communication services from the plurality of different communication service providers comprises a second communication service from a second communication service provider.

12. The computer program product of claim 11, wherein the mobile number is a Mobile Station International Subscriber Directory Number.

13. The computer program product of claim 11, wherein the plurality of communication services comprises different communication services from the plurality of different communication service providers.

14. The computer program product of claim 11, wherein the plurality of communication services comprises the same communication service from each of the plurality of different communication service providers.

15. The computer-implemented method of claim 1, wherein the mobile number comprises forms of public uniform resource identifier.

16. The computer-implemented method of claim 1, wherein subscribing, by the computer, a communication service with the communication service provider using the mobile number, wherein the mobile number is simultaneously used to subscribe a plurality of communication services with a plurality of different communication service providers comprises:

sending, by the computer, a request to the mobile number authority for validating the eligibility of the mobile number to subscribe the communication service with the communication service provider.

17. The computer of claim 6, wherein the mobile number comprises forms of public uniform resource identifier.

18. The computer of claim 6, wherein subscribing, by the computer, a communication service with the communication service provider using the mobile number, wherein the mobile number is simultaneously used to subscribe a plurality of communication services with a plurality of different communication service providers comprises:

sending, by the computer, a request to the mobile number authority for validating the eligibility of the mobile number to subscribe the communication service with the communication service provider.

19. The computer program product of claim 11, wherein the mobile number comprises forms of public uniform resource identifier.

20. The computer program product of claim 11, wherein subscribing, by the computer, a communication service with the communication service provider using the mobile number, wherein the mobile number is simultaneously used to subscribe a plurality of communication services with a plurality of different communication service providers comprises:

sending, by the computer, a request to the mobile number authority for validating the eligibility of the mobile number to subscribe the communication service with the communication service provider.

* * * * *